Aug. 30, 1932.  R. C. BERGVALL  1,874,163
VOLTAGE STABILIZING MEANS FOR DIRECT CURRENT GENERATORS
Filed Feb. 28, 1931
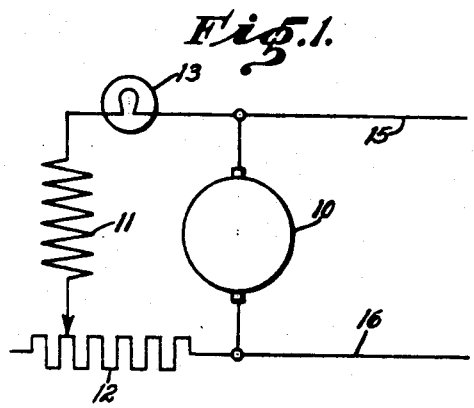
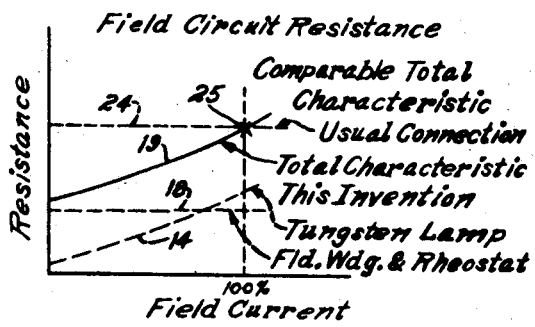
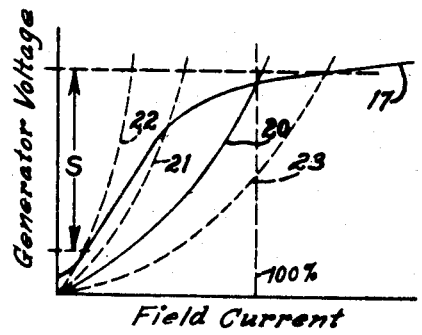
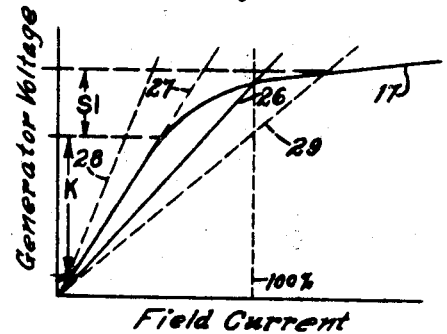
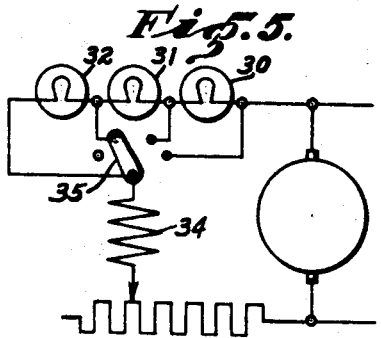
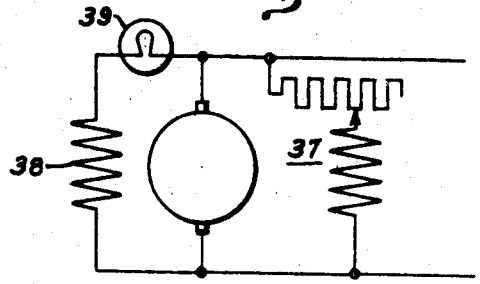
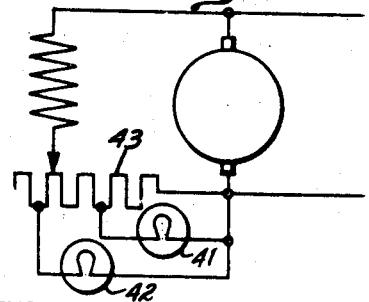
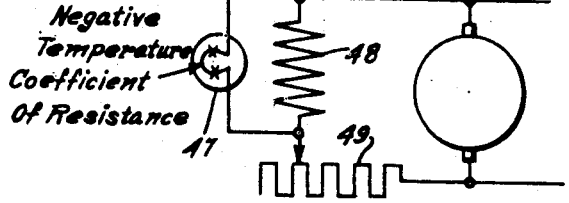
WITNESSES
R. S. Williams
Carlton F. Bryant
INVENTOR
Royal C. Bergvall
BY
ATTORNEY Patented Aug. 30, 1932

1,874,163

UNITED STATES PATENT OFFICE

ROYAL C. BERGVALL, OF WILKINSBURG, PENNSYLVANIA, ASSIGNOR TO WESTINGHOUSE ELECTRIC & MANUFACTURING COMPANY, A CORPORATION OF PENNSYLVANIA

VOLTAGE-STABILIZING MEANS FOR DIRECT-CURRENT GENERATORS

Application filed February 26, 1931. Serial No. 519,059.

My invention relates to electrical generators and has particular relation to means for increasing the range of stable-voltage operation of generators of the self-excited, direct-current type.

It is well known that the lower limit in the practical voltage range of a self-excited, direct-current generator is determined by the amount of resistance that can be inserted in the shunt-field-winding circuit before voltage instability results. In practice, it is found that this lower limit of stable voltage is, for machines of commercial designs, a relatively large percentage of the normal voltage rating. Consequently, self-excited generators are inherently incapable of satisfactory operation at the lower voltage values without the use of special stability-producing means. Likewise, it is frequently found that, even within the range of inherent voltage stability, self-excited generators are extremely sluggish in their response to changes in the setting of the voltage-adjusting means or are slow in building up their voltage upon being placed in operation.

In order to increase the voltage range over which a self-excited, direct-current generator can be controlled without becoming unstable, or to improve the speed of voltage response to excitation change, it has, in the past, been necessary to change the shape of the saturation curve, or shift its position, so that the field-characteristic curve will intersect it at the desired sharp angle.

In my copending application, Serial No. 461,303, filed June 16, 1930, and assigned to the Westinghouse Electric & Manufacturing Company, I have described such methods for shifting the position of the saturation curve, through the provision of an auxiliary field winding energized from a separate source, or through the use of high residual magnetic material in the generator field poles. Such expedients, however, while giving satisfactory results, are, in certain cases, unduly expensive, since a slight departure must be made from the so-called "standard" designs of generators in order to adapt them for such utilization.

A similar result is likewise obtainable through the provision of a pilot exciter for the generator. While this expedient is also satisfactory from a performance standpoint, it has the disadvantages of substantial cost increase and added equipment complication.

My invention is directed to an improved method for obtaining an increased range of stable voltage operation of self-excited, direct-current generators, and for increasing the speed of voltage-change response thereof.

It is, accordingly, an object of my invention to provide means for increasing the range of voltage stability of self-excited, direct-current generators.

Another object of my invention is to increase the rate at which the voltage of a self-excited, direct-current generator is capable of building up and of following, in its magnitude, changes in the setting of the voltage-adjusting means.

A further object of my invention is to eliminate the need for pilot exciters and similar auxiliaries in connection with direct-current generators which must be capable of voltage adjustment and operation throughout practically the entire range of their saturation curves.

More specifically stated, it is the object of my invention to change the shape of the field characteristic of a direct-current, self-excited generator in such manner that, when shifted by rheostat action, it will provide a sharp intersection with the saturation curve of the machine throughout substantially the entire length of the curve.

In practicing my invention, I contemplate the attainment of these and other objects through the provision, in the field circuit of the generator, of a conducting element which has the property of changing its electrical resistance as the magnitude of the current passed through it is changed. By such means, the effective field-circuit resistance may be caused to increase as the field current rises, and the field characteristic may thereby be changed, from the usual straight line, to a curved line which is concave upward and which intersects the saturation curve of the generator at an angle of increased sharpness.

I have found that the well known tungsten-filament and the carbon-filament incandescent lamps possess the required rising-resistance-with-current and the lowering-resistance-with-current characteristics, respectively, and, due to their ready availability and low cost, they represent the type of elements which I prefer to utilize as the current-regulating devices in the embodiments of my invention which I have devised. It will be understood, however, that other devices possessing the changing-resistance-with-current characteristic, such as a length of metallic wire of high-temperature of resistance coefficient, preferably enclosed in an air-exhausted container to prevent oxidation at high temperatures, as well as other similar rheostatic conductors, may also be utilized in the system of my invention.

My invention itself will best be understood from the following detailed description of specific embodiments, when taken in conjunction with the accompanying drawing, in which, Figure 1 is a diagrammatic view schematically representing a self-excited, direct-current generator arranged in accordance with one form of my invention, Fig. 2 is a diagram of curves showing the resistance characteristics of the field circuit of the system of Fig. 1.

Fig. 3 is a diagram showing the saturation curve for the generator of the system of Fig. 1, and field-circuit characteristic curves for a plurality of different settings of the voltage-adjusting field rheostat.

Fig. 4 is a diagram showing the saturation curve for the generator of Fig. 1 and the corresponding field-circuit-characteristic curves for previously known systems.

Figs. 5, 6, and 7 are diagrammatic views of modifications of the basic system of Fig. 1, as applied to self-excited generators.

Fig. 8 is a diagrammatic view schematically representing a second form of my invention, as applied to a direct-current, self-excited generator.

Referring to the drawing, particularly to Fig. 1 thereof, reference numeral 10 designates the armature of a direct-current generator which is provided with a shunt-field winding 11 and a voltage-adjusting field rheostat 12. The generator is disposed to supply a direct-current voltage to circuit conductors 15 and 16, from which field winding 11 is energized. Combined with the field-winding circuit is a tungsten lamp 13 through which the exciting-field current passes.

Because of the high positive temperature coefficient of resistance which the tungsten filament possesses, the tungsten lamp has a rising-resistance with current characteristic, which is of the general shape represented by curve 14 of Fig. 2, the resistance of the lamp being relatively low for small current values and increasing rapidly, in the manner shown, as the current is increased to the normal or full brilliancy value. Tests show that, when cold, a tungsten lamp may have a resistance which is only 10% of its hot or full lamp-brilliancy value.

The relation between the magnitude of exciting current in the field winding 11 and the value of voltage induced in the generator armature 10 when the generator is driven at a constant speed by some external mechanical means, is given by curve 17, in Figs. 3 and 4. Curve 17 is the saturation curve of the generator, and the shape illustrated will be recognized as being typical of generators of commercial designs. It is shown to further clarify the explanation of the fundamental principles underlying my invention.

The resistance of field winding 11 and rheostat 12, at a given setting, is practically independent of the value of field current and may be represented, in Fig. 2, by line 18. The resistance of the entire field circuit, including device 13, may be represented by curve 19 of Fig. 2, which, it will be observed, is the sum of curves 14 and 18.

A total field-circuit resistance characteristic 19 of the rising type produces an upwardly curved resistance line for the field circuit, of the shape shown at 20 in Fig. 3. It will be recognized that the field-circuit-resistance line, which shows the relation between the voltage impressed upon the field-winding circuit and the current flowing therein, is inherently a straight line, the slope of which is determined by the amount of resistance in the circuit. Through my invention, however, I am able to change the shape of this line to the curved form shown in Fig. 3, with the resulting advantages which are to be pointed out.

As voltage-regulating rheostat 12 is adjusted to give increasing values of resistance, the position of the field-circuit-resistance line progressively moves to the left, as shown by the dotted lines in Fig. 3, and may there be represented by lines 21 and 22, while a decrease in rheostat resistance shifts the line to the right, as to position 23. The respective points of intersection of these field-circuit-resistance lines with the saturation curve 17 determine the value to which the generator voltage will build up, while the area between the saturation and field-resistance curves, as well as the sharpness of the intersection, may be taken as a measure of the stability of operation and the rapidity with which the voltage will respond, in magnitude, to changes in excitation at the respective intersecting points, corresponding to definite generator-voltage values.

It will be observed that, through the utilization of a field circuit possessing a curved resistance line of this general shape, shown in Fig. 3, it is possible to operate the generator at terminal voltages which correspond to practically the entire range of the complete saturation curve. In Fig. 3, this range of stable voltages is designated by S.

By way of comparison, the curves in Fig. 4 have been drawn to illustrate the performance of the generator of Fig. 1 when element 13 is omitted from the field circuit. Such an omission gives the total resistance characteristic of the field circuit the straight horizontal-line form, indicated at 24 in Fig. 2, which, at full rated value of field current, intersects the previously described total characteristic 19 at point 25 in order to provide the same degree of excitation at that point. The corresponding straight field-circuit-resistance line is shown in Fig. 4 at 26. Increase in the rheostat resistance shifts the position of this line progressively to the left, to the positions represented at 27 and 28, respectively, and decrease in the resistance shifts to the right to position 29.

It will be recognized that position 27 of the field-circuit-resistance line corresponds to the maximum resistance in the field circuit with which the voltage of the generator will build up. It further results in unstable operation of the generator throughout the range designated by K, within which range the field-resistance line coincides with the straight portion of the saturation curve 17, which condition makes for instability, as is well known.

It will, therefore, be apparent that the range of stable-voltage operation of a generator connected in accordance with my invention, designated in Fig. 3 by S, is considerably larger than when the field circuit of the same generator is arranged in a previously known manner, in which case, the stability range is limited to the small value indicated by S1 in Fig. 4. Likewise, it will be observed that my invention increases the sharpness of the angle of intersection of, and more distantly separates, the field-resistance line from the saturation curve, which conditions are known to make for greater rapidity in the building up or down of the generator voltage in response to changes in excitation.

Heretofore, as has been pointed out, in cases in which it has been necessary to operate the generator within the inherently unstable range K, (Fig. 4) a pilot exciter or other stability-producing means had to be resorted to with the attending additional first cost, maintenance and complication. My invention provides a highly effective means for accomplishing the same result in an efficient practical and inexpensive manner.

In generator applications in which it is not ordinarily necessary to extend the range of stable-voltage operation down to the lowest voltage values, the arrangement shown in Fig. 5, wherein a plurality of tungsten lamps 30, 31 and 32, or equivalent devices, are disposed for progressive insertion in the circuit of the generator field winding 34 through the action of a selector switch 35 or other equivalent device, will be found useful. As will be evident, maximum extension of the stable range is obtainable when all of devices 30, 31 and 32 are in active circuit, and minimum range of stability when none of these devices are actively used.

In Fig. 6, is represented a generator comprising, in addition to the main field circuit 37, an auxiliary self-excited shunt winding 38, in the circuit of which is included one or more tungsten lamps 39, which function to increase the range of stability in the manner already explained, although such extensions will necessarily be of smaller magnitude than would be possible were lamps also inserted in the main field circuit 37. This modification is best suited to generator applications in which only a limited voltage-stability increase is required.

A further modification of my invention is illustrated in Fig. 7 in which a plurality of tungsten lamps 41 and 42 are associated with the resistance of the field rheostat 43, in some manner such as there shown, to give the field circuit a rising resistance characteristic with current which, in degree, is dependent upon the quantity of rheostat resistance in active circuit.

The modification illustrated in Fig. 8 differs from the systems of the preceding figures in that it utilizes a lowering-resistance-with-current conducting element 47 disposed in parallel with the generator field winding 48 in combination with the usual voltage-adjusting rheostat 49, instead of the rising-resistance-with-current elements disposed in the series relations already described. A carbon-filament incandescent lamp, because of the negative temperature coefficient of resistance of the filament, possesses the required characteristics for this application, and, when utilized in position 47 of Fig. 8, acts to give the field winding 48 an upwardly curved resistance line of the general form illustrated by curves 20 to 23 of Fig. 3, with the resulting advantages in voltage stability and quickness of response already pointed out.

It will be understood that the action of device 47 is to shunt increasingly larger proportions of the current supplied through rheostat 49 away from winding 48 as the voltage impressed thereon is increased in magnitude, with the beneficial results already discussed.

It will be apparent that still further modifications are readily possible and, when properly made, may be utilized to give a field-resistance line of practically any desired shape, within the usual reasonable limits.

Likewise, the changing-resistance-with-current conducting devices utilized by my invention need not be confined to incandescent lamps alone, as other equivalent devices may also be used with equal success, as has been pointed out.

It will, therefore, be seen that, through my invention, I have provided effective, inexpensive and extremely simple means for increasing the range of stable-voltage operation and of quickening the response of self-excited direct-current generators, which, when applied to machines of known designs will effect marked reductions in the cost of equipment required to give results peculiar to, and required by, a large number of applications well known and recognized in the art.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In the field-winding circuit of a self-excited, direct-current generator, in combination, rheostatic voltage-adjusting means, and a conducting element having a changing resistance with current characteristic, said element being so disposed in the circuit as to cause the current in the field winding to change at a slower rate than does the generator voltage applied to the field-winding circuit, the effect of said element being to permit the generator to stably operate at low values of voltage produced by the insertion in the field winding circuit of large values of resistance by said rheostatic means.

2. The combination, with a dynamo-electric generator having a field winding, a circuit for exciting said field winding from the generator terminals, and a rheostat in said excitation circuit for adjusting the generator voltage, of a device associated with said excitation circuit for automatically increasing the electrical resistance thereof in accordance with the magnitude of current flow therethrough, said device thus being effective to cause, at a given setting of said rheostat, the current in the field winding to increase at a slower rate than does the generator voltage, to thus permit, in operation of the generator, voltage stability throughout substantially the entire voltage range of the machine.

3. The combination of a dynamo-electric generator having a field winding, a circuit for exciting said field winding from the generator terminals, a rheostat in said excitation circuit for adjusting the generator voltage, and a high-positive-temperature-coefficient of resistance device disposed in said excitation circuit, said device acting to increase the electrical resistance of the circuit in accordance with the magnitude of current flow therethrough to thus permit, in operation of the generator, voltage stability throughout substantially the entire potential range of the machine.

4. In the field-winding circuit of a self-excited dynamo-electric-machine, in combination with voltage-adjusting means, a positive-temperature-coefficient of resistance device disposed to increase the resistance of said circuit in accordance with the magnitude of current flow therethrough, to thus increase the rate at which the generator voltage is capable of building up or down in response to changes in the adjustment of said voltage-adjusting means, and to broaden the stable-voltage operating range of the generator.

5. In the field-winding circuit of a self-excited-direct-current generator, in combination, voltage-adjusting means, and a conducting element having a negative-temperature-coefficient of resistance so disposed as to cause the current in the field winding to change at a slower rate than does the generator voltage applied to said field-winding circuit, said element thereby acting to broaden the stable-voltage operating range of the generator.

6. In the field-winding circuit of a self-excited direct-current generator, in combination, a series-connected voltage-adjusting rheostat, and a lowering-resistance-with-current characteristic resistor element disposed to parallel said field winding, said element acting to by-pass from the field winding increased percentages of the total rheostat current, as the magnitude of this current is raised, to thereby cause the field-winding current to increase at a slower rate than does the generator voltage which energizes the field winding circuit and to thus broaden the stable-voltage operating range of the generator.

7. The combination of a dynamo-electric generator having a field winding, a circuit for exciting said field winding from the generator terminals, a rheostat in said excitation circuit for adjusting the generator voltage, and a lowering-resistance-with-current conducting device disposed to parallel said field winding, said device functioning to cause, at a given setting of said rheostat, the current in the field winding to increase at a slower rate than does the generator voltage in building up, to thus permit, in operation of the generator, voltage stability throughout substantially the entire potential range of the machine.

8. A voltage-stability improving system for a direct-current generator of the dynamo-electric type having a field winding comprising, in combination with a field-winding circuit disposed to be energized by the generator voltage and a voltage-adjusting rheostat connected in said circuit, a changing-resistance-with-current conducting device associated with said circuit in a manner that the field-winding current will be caused to change at a slower rate than does the generator voltage applied to the field winding circuit to thereby extend the lower limit in the range of stable voltage adjustment which may be effected by increasing the resistance of said voltage-adjusting rheostat.

9. A voltage-stability improving system for a direct-current generator of the dynamo-electric type having a field winding comprising, in combination with a field-winding circuit disposed to be energized by the generator voltage and a voltage-adjusting rheostat connected in said circuit, a changing-resistance-with-current conducting device associated with said circuit in a manner that the field-winding current will be caused to change at a slower rate than does the generator voltage applied to the field winding circuit to thereby extend the lower limit in the range of stable voltage adjustment which may be effected by increasing the resistance of said voltage-adjusting rheostat, said device comprising a tungsten-filament incandescent lamp connected in series-circuit relation with the said field winding and the rheostat.

10. A voltage-stability improving system for a direct-current generator of the dynamo-electric type having a field winding comprising, in combination with a field-winding circuit disposed to be energized by the generator voltage and a voltage-adjusting rheostat connected in said circuit, a changing-resistance-with-current conducting device associated with said circuit in a manner that the field-winding current will be caused to change at a slower rate than does the generator voltage applied to the field winding circuit to thereby extend the lower limit in the range of stable voltage adjustment which may be effected by increasing the resistance of said voltage-adjusting rheostat, said device comprising a carbon-filament incandescent lamp connected in parallel with the said field winding, said rheostat being connected in series with said field winding.

11. In combination with a direct-current generator having a field winding disposed, through the medium of a field-winding circuit, to be energized by the voltage of the generator, rheostatic means disposed in said circuit to adjust the magnitude of generator voltage, and a changing-resistance-with-current conducting device associated with said circuit in a manner that, while maintaining the speed of the generator at normal value, the generator voltage may, by insertion in the said field-winding circuit, by the said rheostatic means, of increased values of resistance, be reduced to extremely low values without instability resulting.

12. In combination with a direct-current generator having a field winding disposed, through the medium of a field-winding circuit, to be energized by the voltage of the generator, rheostatic means disposed in said circuit to adjust the magnitude of generator voltage, and a changing-resistance-with-current conducting device associated with said circuit in a manner that, while maintaining the speed of the generator at normal value, the generator voltage may, by insertion in the said field-winding circuit, by the said rheostatic means, of increased values of resistance, be reduced to extremely low values without instability resulting, said device comprising a conducting element, the resistance of which is materially increased by the effect of current flow therethrough, connected in series-circuit relation with the said field winding and the said rheostatic means.

13. In combination with a direct-current generator having a field winding disposed, through the medium of a field-winding circuit, to be energized by the voltage of the generator, rheostatic means disposed in said circuit to adjust the magnitude of generator voltage, and a changing-resistance-with-current conducting device associated with said circuit in a manner that, while maintaining the speed of the generator at normal value, the generator voltage may, by insertion in the said field-winding circuit, by the said rheostatic means, of increased values of resistance, be reduced to extremely low values without instability resulting, said device comprising a conducting element, the resistance of which is materially decreased by the effect of current flow therethrough, connected in parallel with the said field winding, said rheostatic means being connected in series with said field winding.

In testimony whereof, I have hereunto subscribed my name this 17th day of February, 1931.

ROYAL C. BERGVALL.